(12) United States Patent
English et al.

(10) Patent No.: US 8,933,823 B2
(45) Date of Patent: Jan. 13, 2015

(54) DISTRIBUTED VIDEO TRANSCODE SYSTEM WITH ADAPTIVE FILE PROCESSING

(76) Inventors: David Alexander English, Jacksonville, FL (US); Benjamin McCallister, Jacksonville, FL (US); Mark Robert Bishop, Ponte Vedra Beach, FL (US)

( * ) Notice: Subject to any disclaimer, the term of this patent is extended or adjusted under 35 U.S.C. 154(b) by 42 days.

(21) Appl. No.: 13/518,347

(22) PCT Filed: Sep. 22, 2010

(86) PCT No.: PCT/US2010/002608
§ 371 (c)(1),
(2), (4) Date: Nov. 12, 2012

(87) PCT Pub. No.: WO2011/078875
PCT Pub. Date: Jun. 30, 2011

(65) Prior Publication Data
US 2013/0049998 A1    Feb. 28, 2013

Related U.S. Application Data

(60) Provisional application No. 61/289,201, filed on Dec. 22, 2009.

(51) Int. Cl.
*H03M 7/34* (2006.01)
*H04L 29/06* (2006.01)
*H04L 29/08* (2006.01)

(52) U.S. Cl.
CPC .......... *H04L 65/605* (2013.01); *H04L 67/1002* (2013.01)
USPC ............................................. 341/51; 341/50

(58) Field of Classification Search
CPC ... H04L 65/605; H04L 67/1002; H04L 29/06; H03M 7/34
USPC ...................................................... 341/50–51
See application file for complete search history.

(56) References Cited

U.S. PATENT DOCUMENTS

| 7,155,475 | B2 * | 12/2006 | Agnoli et al. ................. 709/201 |
| 7,266,611 | B2 * | 9/2007 | Jabri et al. .................... 709/231 |
| 7,365,655 | B2 * | 4/2008 | Rao et al. ........................ 341/50 |
| 7,991,908 | B2 * | 8/2011 | Drogo de Iacovo et al. . 709/232 |
| 2003/0158913 | A1 * | 8/2003 | Agnoli et al. ................. 709/219 |

OTHER PUBLICATIONS

Guo, Jiani, et al., "Load Sharing in a Transcoding Cluster", Distributed Computing—IWDC 2003, Jan. 23, 2004, pp. 330-339, XP019002165.
International Search Report for International Application No. PCT/US2010/002608, mailed Feb. 24, 2011, 2 pages.
International Preliminary Report on Patentability dated Jun. 26, 2012 and Written Opinion dated Feb. 24, 2011 regarding PCT/US2010/002608.
Notice of Reasons for Rejection dated Mar. 4, 2014 regarding Japan Application No. JP2012-545923.
First Office Action and Examiner's Search Report dated Jun. 26, 2014 regarding China Patent Application No. 2010800629441.

\* cited by examiner

*Primary Examiner* — Khai M Nguyen
(74) *Attorney, Agent, or Firm* — Arent Fox LLP

(57) ABSTRACT

To obtain greater transcoding efficiency, a node administrator (160) distributes digital files among transcoding nodes (120, 140 and 190) based on a comparison of a transcoding profile for each digital file and the transcoding histories of the transcoding nodes. In this way, the node administrator (160) will select the transcoding node best able to undertake transcoding, taking into account the characteristics of the file to be transcoded.

20 Claims, 2 Drawing Sheets

DISTRIBUTED VIDEO TRANSCODE SYSTEM WITH ADAPTIVE FILE PROCESSING

CROSS-REFERENCE TO RELATED APPLICATIONS

This application is a United States National Stage Application under 35 U.S.C. §371 of International Patent Application No. PCT/US2010/002608, filed Sep. 22, 2010, which claims the benefit to U.S. Provisional Application No. 61/289,201, filed Dec. 22, 2009, each of which is incorporated by reference into this application as if fully set forth herein.

TECHNICAL FIELD

This invention relates to transcoding of files containing digital information.

BACKGROUND ART

As digital technology proliferates, so too has the number of different digital file formats. Many digital devices only possess the ability to accept digital files in one format. Thus, to accommodate devices that make use of different formats, systems that distribute digital files employ one or more transcoders which comprise mechanisms for converting digital files in one format to another format.

The standard approach to transcoding digital files makes use of a "Round-robin" methodology, whereby files undergo transmission to alternating nodes in a transcoding network. Each node typically has the ability to transcode a digital file, e.g., a digital video file, from one format to another. The round-robin approach has proven inefficient because of its inability to accomplish true load balancing among nodes. When performing less than full file transcodes, render farms can process individual frames, or chunks of data, in order to balance the load across every node properly. With regard to transcoding of full files, separating chunks of data for distribution to individual nodes has proven difficult. Each node must fully process a file. The traditional "render farm" approach does not apply to this form of load balancing.

BRIEF SUMMARY OF THE PRESENT PRINCIPLES

Briefly, in accordance with a preferred embodiment of the present principles, an improved technique for transcoding a digital file provides for increased efficiency. The transcoding technique of the present principles selects among one of a plurality of transcoding nodes for transcoding a digital file based on a comparison of a transcoding profile for the digital file, the characteristics of the source digital file to be transcoded, the priority of the digital file to be transcoded and a transcoding histories of the transcoding nodes.

As an example, the transcoding profile of a digital video file could include information as to the size, input media format, output media format, compression level and duration. A comparison occurs between the transcoding histories for individual transcoding and the transcoding profile to determine, as among the nodes which have a history of processing files with similar profiles, which node offered better performance, for example faster processing for a file having a similar transcoding profile.

DETAILED DESCRIPTION

Figure 1:
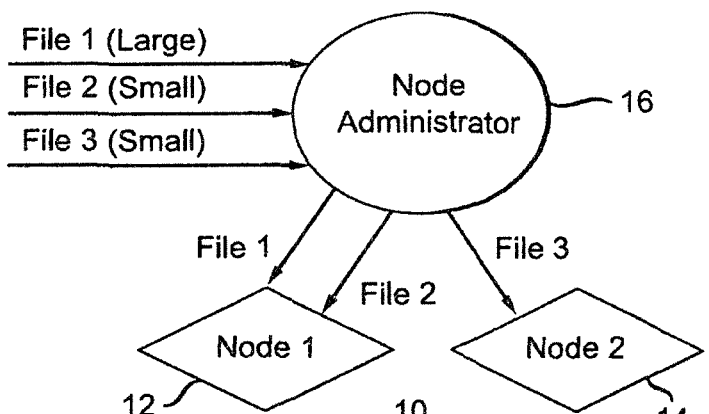
FIG. 1 depicts a prior art transcoding system which employs traditional "round-robin" methodology.

FIG. 1 depicts a block schematic diagram of a prior-art transcoding system 10 for transcoding digital files, including but not limited to digital video, from one format into another. For example, the transcoding system 10 of FIG. 1 can convert a digital video file formatted in the Microsoft Windows Media® into the H.264 format. Transcoding of files between other formats can also occur.

In practice, the prior art transcoding system of FIG. 1 includes a plurality of transcoding nodes, represented by nodes 12 and 14, each typically comprised of a machine (e.g., a digital computer programmed with software) for receiving commands and digital files. In response to such commands, the transcoding nodes 12 and 14 transcode the received digital files from one format to another. Mechanisms for transcoding digital files exist in the art and the details of the transcoding nodes 12 and 14 have been omitted for simplicity.

A node administrator 16 functions to distribute incoming digital files to the transcoding nodes 12 and 14 for transcoding. As depicted in the illustrated example of FIG. 1, the node administrator 16 has received three files, designated as File 1, File 2 and File 3, for distribution to the transcoding nodes 12 and 14. For purposes of discussion, File 1 has a size much larger than File 1 and File 2.

The node administrator 16 of the prior art transcoding system 10 typically includes a processor (not shown) and possibly other hardware for distributing Files 1, File 2 and File 3 to the transcoding nodes 12 and 14 on a "round-robin" basis. In other words, the node administrator 16 will distribute a first file, (i.e., File 1) to transcoding node 12 and then a second file (i.e., File 2) to transcoding node 14 and then a third file (i.e., File 3) to transcoding node 12. Thus, in the case of a two-node system, as depicted in FIG. 1, the node administrator 16 will alternately send files to the transcoding nodes 12 and 14. For a transcoding system with more nodes, the node administrator 16 will send files to each of the transcoding nodes in succession and then repeat the process until all files have been distributed.

The round-robin approach to transcoding file distribution to transcoding nodes generally does not achieve high efficiency. The following example will illustrate the deficiency of the round-robin approach. Assume that File 1, File 2 and File 3 each comprise a video file with the following characteristics:

File 1—Ten minute long Windows Media File converted into an H.264 file.

Processing power required: High

File 2—2 minute long Windows Media File converted into a more compressed Windows Media File Processing power required: Low File 3—2 minute long Windows Media File converted into a Flash Media File Processing power required: Medium Using a traditional round-robin transcoding methodology, the node administrator 16 of FIG. 1 would submit File 1, File 2, and File 3 to the transcoding nodes 12 and 14 in alternating order based on the time the node administrator received the file. Thus, node transcoding 12 would receive both Files 1 and File 3, while transcoding node 14 would only receive File 2. In addition, the traditional method does not take into account either input media characteristics (e.g. length, type, resolution, bitrate) or output media characteristics (e.g. type, resolution, bitrate).

In accordance with the present principles, an improved transcoding method achieves greater efficiency by intelligently distributing files among transcoding nodes in accordance with the transcoding profile of the file, and the experience of the nodes processing files have similar profiles. The transcoding profile of the file contains information related to the work (e.g., the computational effort) required for transcoding. For example, the file's characteristics (referred to as "Large", "Medium" or "Small" in this example, but can be more granular in practice) constitutes a measure of the amount of processing power and time required to complete the transcoding task. Additionally, the complexity of transcoding a file can also depend on other factors including but not limited to: input file format, output file format, file duration, compression type, and bit rate.

Figure 2:
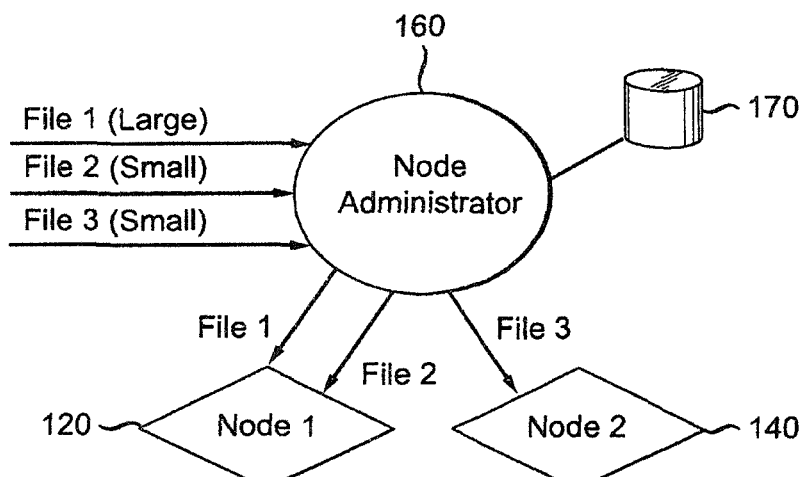
FIG. 2 depicts a transcoding system in accordance with first embodiment of the present principles which makes intelligent transcoding decisions to improve transcoding efficiency.

FIG. 2 depicts a block schematic diagram of a transcoding system 100 in accordance with the present principles for intelligently distributing files to transcoding nodes to achieve improved efficiency. The transcoding system 100 of FIG. 2 includes a plurality of transcoding nodes, illustratively represented by nodes 120 and 140; each typically configured the same as transcoding nodes 12 and 14 of FIG. 1. As will become better understood hereinafter, the exact nature of the transcoding nodes 120 and 140 does not play a role in the intelligent transcoding technique of the present principles. What is important is the ability of the Node Administrator 160 to record and analyze the "history" of processing by each node, for example, the availability of the node to perform transcoding as well as the time spent by the transcoding node to transcode a file having a known profile. A transcoding node may have the capability to process one or more jobs at the same time. Additional jobs can be placed in a work queue to be processed by that node.

The transcoding system of FIG. 2 includes a node administrator 160 for distributing files to the transcoding nodes 120 and 140. To that end, the node administrator 160 includes a processor (not shown) and possibly other hardware for distributing files. In contrast to the node administrator 16 of FIG. 1, the node administrator 160 of FIG. 2 does not employ the traditional First-In First-Out, Round-robin methodology. Rather, the node administrator 160 of FIG. 2 applies an intelligent transcoding approach by taking account of the transcoding history of the transcoding nodes 120 and 140 in order to distribute files among transcoding nodes. To that end, the node administrator 160 enjoys a link to a database 170 that typically makes use of a server program, such as Microsoft SQL Database Server, for storing and accessing the transcoding history of the transcoding nodes 120 and 140. While FIG. 2 depicts the database 170 as separate from the node administrator 160, the database could exist as part of the node administrator itself. Likewise while FIG. 2 depicts the database 170 linking to the Node Administrator 160, the database could also link to each of the transcoding nodes 120 and 140.

In accordance with the present principles, the node administrator 160 distributes files among the transcoding nodes 120 and 140 based on a comparison of the transcoding history of the nodes for files having similar profiles to the files undergoing submission to the transcoding nodes. The following example will illustrate the manner in which the node administrator 160 of FIG. 2 advantageously accomplishes transcoding through intelligent delivery of files to the transcoding nodes 120 and 140. Assume that the node administrator 160 simultaneously receives three files, File 1, File 2 and File 3, which are large, small and medium, respectively. Further assume that at the outset, both of transcoding nodes 120 and 140 currently have no other files for transcoding, and each has equal transcoding capabilities.

Initially, with each transcoding code free, the node administrator 160 will select one of the transcoding nodes, say transcoding node 120 to receive the first file, e.g., File 1. For the next file, e.g., File 2, the node administrator 160 will check the transcoding history of the transcoding nodes for comparison against the transcoding profile of the file to undergo transcoding. By comparing the transcoding history of each transcoding node to the transcoding profile of the file to undergo transcoding, the node administrator 160 can select the transcoding node that can offer the fastest performance. Rather than choosing the node that offered the fastest performance, the node administrator 160 could select the transcoding node that is not being used (e.g. is not currently processing files) or that offered the lowest error rate.

With transcoding node 120 occupied with the transcoding of File 1, the node administrator 160 will send File 2 to node 140 based on a comparison of the transcoding histories of the nodes, the transcoding profile of the file, and the fact that node 140 is not currently processing any files. Based on such information, the node administrator 160 would send File 2 to transcoding node 140.

Having made a transcoding node selection for Files 1 and then File 2, the node administrator 160 then determines the destination for File 3. Using the traditional "round-robin" approach, the node administrator 160 would select transcoding node 120 to receive File 3, notwithstanding the fact that transcoding node 120 remains occupied with transcoding File 1 for a longer period of time. However, using the intelligent transcoding approach of the present principles, the node administrator 160 will compare the node transcoding histories to the transcoding profile of File 3 and the current workload of each node. Upon doing so, the node administrator 160 will likely discover that transcoding node 140 is currently processing a small file and will be available before node 120 to perform transcoding for File 3, assuming that File 2 is smaller than the effort required to process File 1. Depending on the relative difference in file sizes between those sent to transcoding nodes 120 and 140, the node administrator 160 could send several files in succession to the same transcoding node, as opposed to sending files alternately to the transcoding nodes, as mandated by the round-robin approach of the prior art.

As discussed previously, the transcoding history for each transcoding node indicates the current activity of the node (i.e., whether currently undertaking transcoding of a given file) as well as the past activities (i.e., the time spent transcoding a file along with the transcoding profile of that file.) Using the transcoding history for a given transcoding node, the node administrator 160 of FIG. 2 can determine the transcoding parameters (e.g., performance time or bit error rate) for that node to transcode a digital file having a given profile by knowing transcoding parameters for that transcoding node associated with transcoding a file having a similar profile.

The intelligent transcoding technique of the present principles does not require any sacrifice over the standard round-robin technique. Indeed, as discussed above, the intelligent transcoding technique of the present principles afford improved efficiency for existing transcoding nodes. Further, the intelligent transcoding technique also readily accommodates additional transcoding easily, by "learning" the transcoding capabilities of new transcoding nodes. Upon the addition of one or more new transcoding nodes, the node administrator 160 would typically submit files to newly configured transcoding nodes by first assuming a baseline performance and then adapting to the actual node performance with more job history. Thus, the intelligent transcoding technique of the present principles advantageously allows the node administrator 160 add new transcoding nodes to the network without necessarily deprecating the older transcoding nodes. Every additional transcoding node, regardless of processing power provides an increase in overall processing power.

Figure 3:
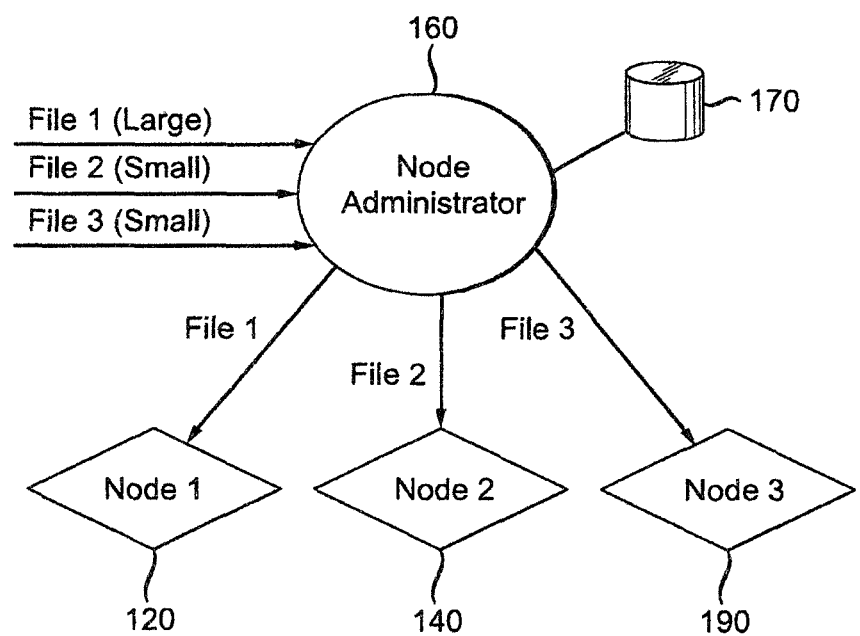
FIG. 3 depicts a transcoding system in accordance with second embodiment of the present principles which makes intelligent transcoding decisions to improve transcoding efficiency by adaptively profiling additional transcoding nodes.

To best appreciate how the intelligent transcoding technique of the present principles easily accommodates additional transcoding nodes, refer to FIG. 3 which depicts a second preferred embodiment of a transcoding system 1000 which has features in common with the transcoding system 100 of FIG. 2. To that end, like reference numbers describe like elements. Thus, like the transcoding system 100 of FIG. 2, the transcoding system 1000 of FIG. 3 includes transcoding nodes 120 and 140, as well as the node administrator 160 together with the database 170. However, the transcoding system 1000 has an additional transcoding node 190, which for purposes of discussion, possesses greater computational strength, and thus can process a file of given characteristics faster than transcoding nodes 120 and 140.

Using the intelligent transcoding technique of the present principles, the node administrator 160 of the transcoding system 1000 of FIG. 3 will distribute files to take advantage of the increased power afforded by transcoding node 190. Assume for purposes of discussion, the node administrator 160 of the transcoding system 1000 of FIG. 3 simultaneously receives File 1, File 2 and File 3 which are large, small, and medium, respectively. Also assume that the transcoding nodes 120, 140 and 190 all have no pending files for processing. Even though node 120 typically appears first on the list of transcoding nodes maintained by the node administrator 160, both of FIG. 3, the node administrator will select the transcoding node 190 to receive File 1. As discussed earlier, the transcoding node 190 has a greater computational strength compared to the transcoding node 120. Thus, a comparison of the transcoding history of transcoding node 190 to the transcoding profile of File 1 will yield a better result than the comparison between the transcoding history of node 120 to the transcoding profile of File 1. As long as the comparison of the transcoding history of transcoding node 190 to the transcoding profile of File 1 yields a better result than the comparison between the transcoding history of node 120 to the transcoding profile of File 1, the node administrator 160 will select the transcoding node 190, if node 190 also has more available transcode capacity (e.g. based on current workload in the queue). Eventually, the transcoding node 190 will receive enough files in the workload queue so that the comparison of workload and performance for node 190 no longer yields a better result than the workload and performance of other nodes. At that time, the node administrator 160 will send files to the transcoding nodes 120 and/or 140.

The intelligent transcoding technique of the present principles further considers the current workload of each transcoding node and along with the performance capability of the node, can assign jobs to provide the best throughput of the system. For example, in using the transcoding system 1000 of FIG. 3, the addition of File 4 of Medium processing requirements is presented to the system. The Node Administrator 160 could assign File 4 to node 120 since it has the lowest workload in processing a small file 2 that will complete soon while 190 is busy with File 1 that with take a long time, node 140 is busy with File 3 which will take a moderate amount of time.

The intelligent transcoding technique of the present principles further permits the assignment of priorities to the files undergoing transcoding. For example, each file can have a certain number of assigned points, with the high number of assigned points indicating a high file priority. When selecting transcoding nodes for receiving files, the node administrator 160 can take into account the file priorities. Such file priorities exist independently of the transcoding profile for the file. Thus, there could exist two files with identical profiles, yet with different prioritization. The node administrator 160 could assign jobs based on the priority of the file which could preempt other jobs in a work queue at a node. For example, if node 120 is currently processing File 2 with priority 100 and has File 4 with priority 20 in queue, then the Node Administrator 160 could insert File 5 with priority 90 in the node 120 work queue above File 4. Therefore Node 120 would process File 2, File 5 and then File 4.

The node administrator 160 could reserve transcoding nodes on a prioritization basis. Thus, the node administrator 160 could reserve one or more transcoding nodes for higher level priority jobs. Utilizing this approach, all lower priority jobs would automatically go to the lower level nodes.

The foregoing describes an intelligent transcoding technique to improve efficiency.

The invention claimed is:

1. A transcoding method comprising:
  selecting one of a plurality of trans coding nodes for transcoding a digital file based on a comparison of characteristics of a source digital file, transcoding profile for the digital file and transcoding histories of the transcoding nodes, wherein the transcoding histories of the transcoding nodes are used to determine transcoding parameters for a transcoding node to transcode a digital file having a similar transcoding profile to the digital file.

2. The method according to claim 1 wherein the transcoding node is selected based on a comparison of a transcoding profile for the digital file and the transcoding histories of individual transcoding nodes with transcoding parameters to obtain fastest performance.

3. The method according to claim 1 wherein the transcoding node is selected based on a comparison of a transcoding profile for the digital file and a transcoding history of individual transcoding nodes with transcoding parameters to obtain least errors.

4. The method according to claim 1 wherein the transcoding profile includes information indicative of computation effort needed for transcoding.

5. The method according to claim 4 wherein the transcoding file profile includes information indicative of file size.

6. The method according to claim 4 wherein the transcoding file profile includes at least one of input file format, output file format, file duration, compression type, and bit 3 rate.

7. A method of transcoding digital files, the method comprising:
assigning a priority to each digital file;
assigning different priorities among a plurality of transcoding nodes; and
selecting, from among the transcoding nodes having a priority not exceeding the file priority, a transcoding node for performing file transcoding based on a comparison of a transcoding profile for the digital file and transcoding histories of the transcoding nodes, including, using the transcoding histories of the transcoding nodes to determine transcoding parameters for a transcoding node to transcode a digital file having a similar transcoding profile to the digital file.

8. The method according to claim 7 wherein the transcoding node is selected based on a comparison of a transcoding profile for the digital file and the transcoding histories of the transcoding nodes with transcoding parameters to obtain fastest performance.

9. The method according to claim 7 wherein the transcoding node is selected based on a comparison of a transcoding profile for the digital file and transcoding histories of the transcoding nodes with transcoding parameters to obtain least errors.

10. The method according to claim 7 wherein the transcoding profile includes information indicative of computation effort needed for transcoding.

11. The method according to claim 10 wherein the transcoding file profile includes information indicative of file size.

12. The method according to claim 11 wherein the transcoding file profile includes at least one of input file format, output file format, file duration, compression type, and bit rate.

13. A method of transcoding digital files, the method comprising:
assigning a priority to each digital file;
and selecting, from among a plurality of transcoding nodes a transcoding node for performing file transcoding based on a comparison of a transcoding profile for the digital file, the transcoding histories of the transcoding nodes, the current workload of the node, including using the transcoding histories of the transcoding nodes to determine transcoding parameters for a transcoding node to transcode a digital file having a similar transcoding profile to the digital file.

14. The method according to claim 13 wherein the transcoding node is assigned a priorities among a plurality of transcoding nodes; and selecting, from among the trans coding nodes having a priority not exceeding the file priority, a transcoding node for performing file transcoding based on a comparison of a transcoding profile for the digital file and transcoding histories of the transcoding nodes.

15. A transcoding system comprising:
a plurality of transcoding nodes; and
a node administrator for selecting from among the plurality of transcoding nodes, a transcoding node for transcoding a digital file based on a comparison of a transcoding profile for the digital file and transcoding histories of the transcoding nodes, including using the transcoding histories of the transcoding nodes to determine transcoding parameters for a transcoding node to transcode a digital file having a similar transcoding profile to the digital file.

16. The transcoding system according to claim 15 wherein the node administrator selects the transcoding node based on a comparison of a transcoding profile for the digital file and the transcoding histories of individual transcoding nodes with transcoding parameters to obtain fastest performance.

17. The transcoding system according to claim 15 wherein the node administrator selects the transcoding node based on a comparison of a transcoding profile for the digital file and the transcoding histories of transcoding nodes with transcoding parameters to obtain least errors.

18. The transcoding system according to claim 15 wherein the trans coding profile includes information indicative of computation effort needed for transcoding.

19. The transcoding system according to claim 18 wherein the transcoding file profile includes information indicative of file size.

20. The transcoding system according to claim 19 wherein the transcoding file profile includes at least one of input file format, output file format, file duration, compression type, and bit rate.

* * * * *